Jan. 23, 1934.  J. B. DICKSON  1,944,154
STOP LIGHT LENS
Filed Feb. 10, 1930    3 Sheets-Sheet 1
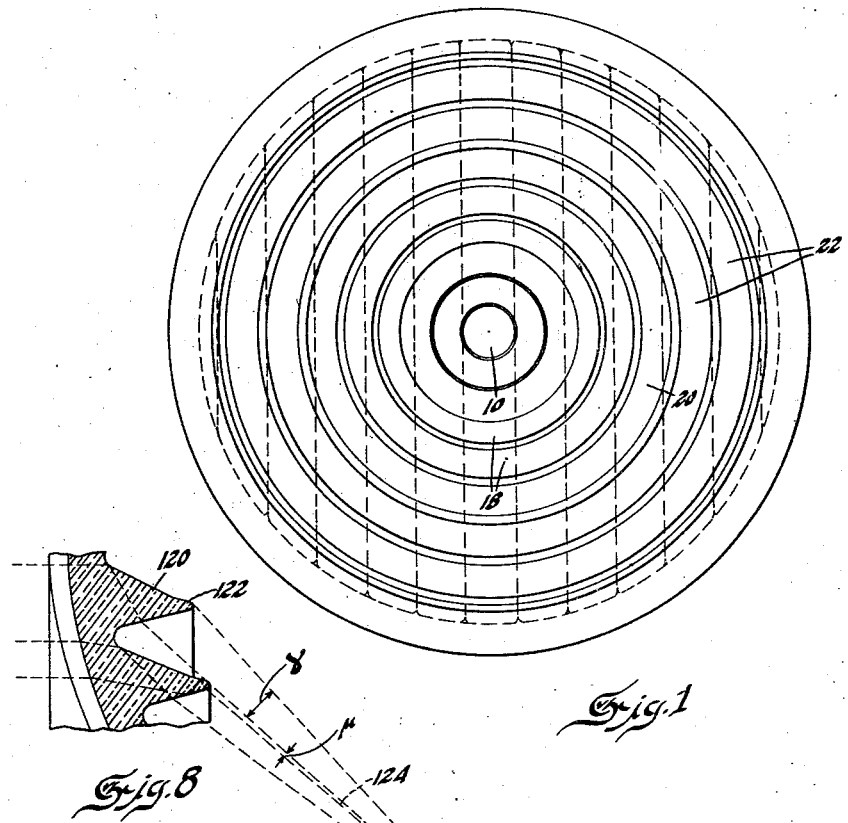
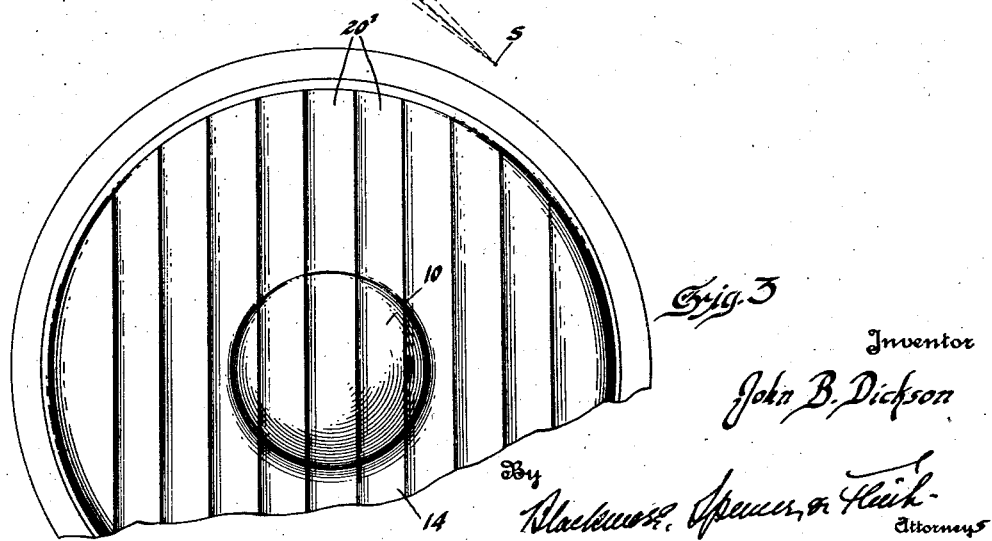
Inventor
John B. Dickson Jan. 23, 1934.          J. B. DICKSON            1,944,154
                         STOP LIGHT LENS
                      Filed Feb. 10, 1930      3 Sheets-Sheet 2
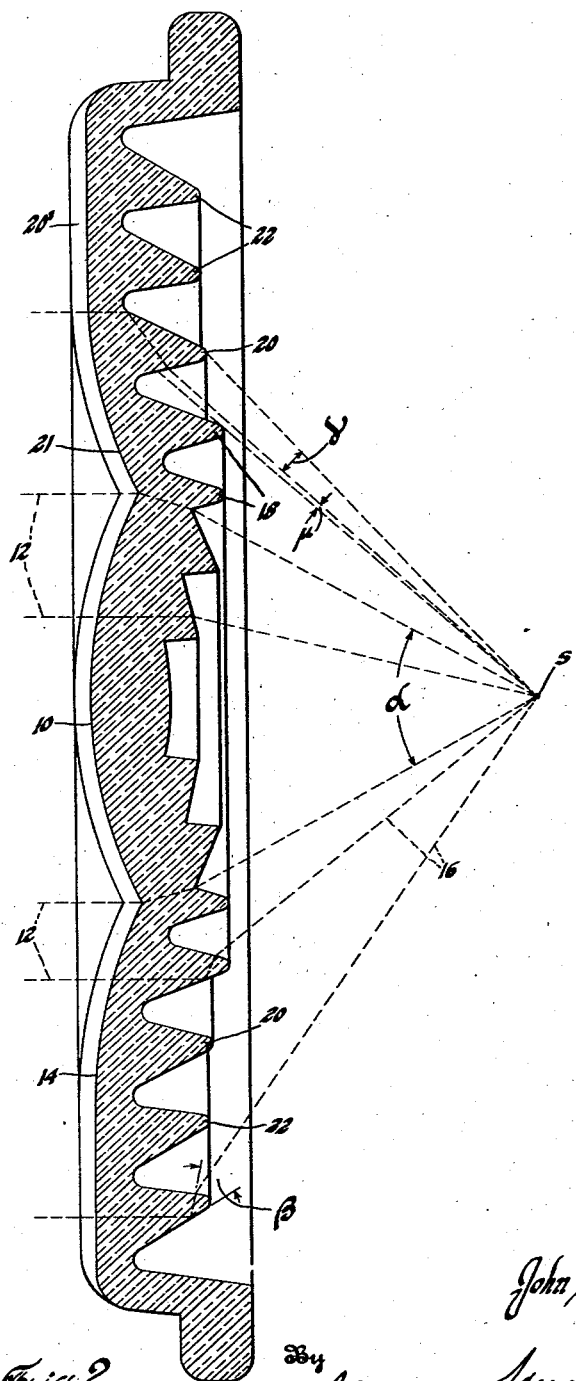

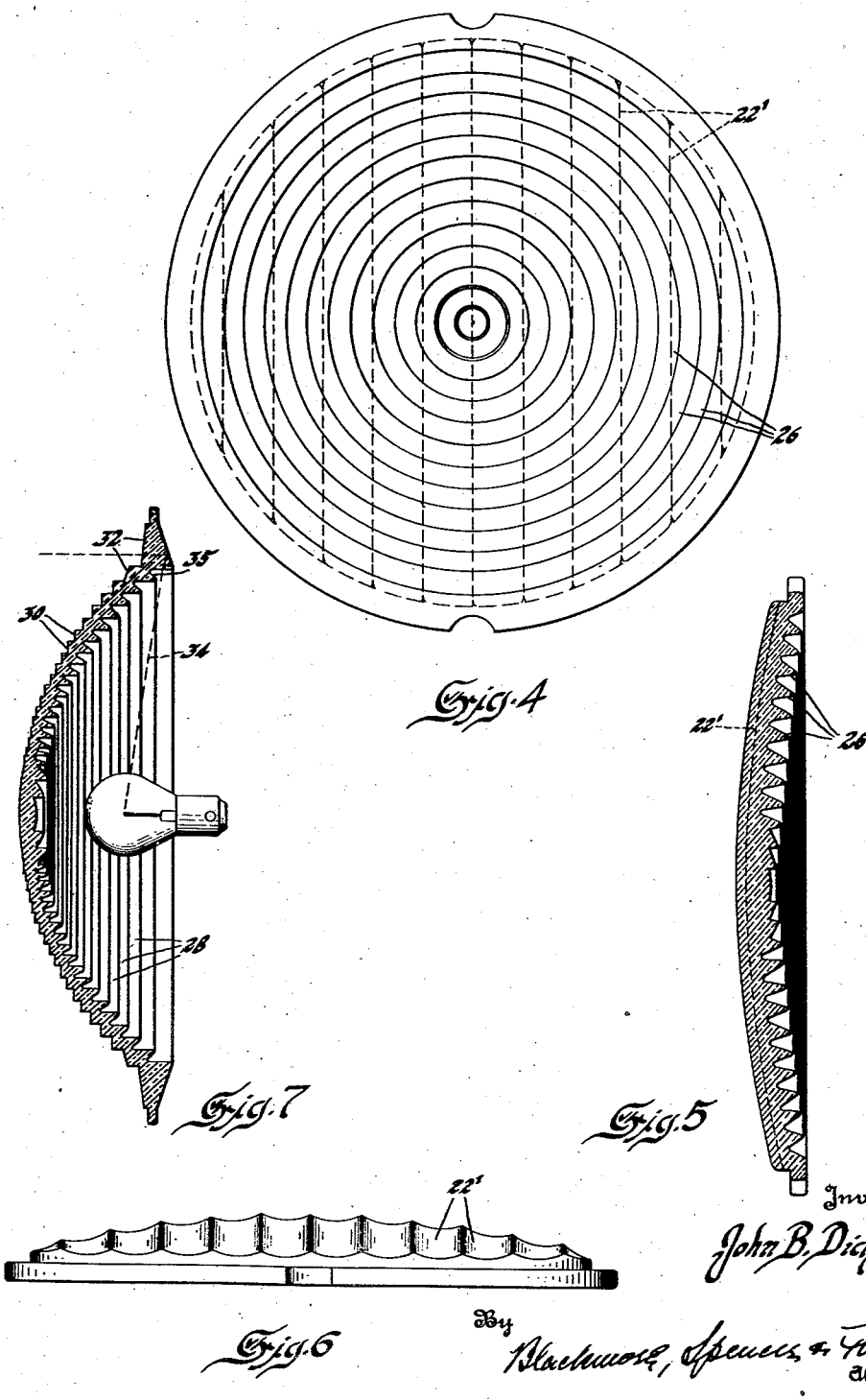

Patented Jan. 23, 1934

1,944,154

UNITED STATES PATENT OFFICE 1,944,154

STOP LIGHT LENS

John B. Dickson, Detroit, Mich., assignor to General Motors Research Corporation, Detroit, Mich., a corporation of Delaware Application February 10, 1930. Serial No. 427,269

9 Claims. (Cl. 177—329)

This invention relates to a lens for stop lights and rear lights such as are in common use on automobiles. The lens is characterized by greater efficiency in that it is capable of receiving and directing in the desired direction a greater proportion of the light emitted from the source than the lenses previously used. The lens is of such design that it may be made by the ordinary pressing methods so that the increased efficiency is obtained at no added expense except for the cost of new molds and plungers.

The increased efficiency is obtained by employing in connection with a central bulls-eye or Fresnel lens a surrounding catadioptric lens. Both lenses are designed to direct the light in parallel rays, the bulls-eye by operation of refraction only, and the catadioptric lens by a combination of refraction and internal reflection. It is well known that a simple bulls-eye or Fresnel lens is limited in its application to the rays emitted within a given spherical angle. If extended beyond this angle the light striking the lens is in large part reflected at the bounding surfaces of the lens and the light that does pass through is decomposed into its various component colors and scattered in different directions. With the Fresnel portion of maximum permissible diameter, the catadioptric portion of the lens is made in the form of annular prisms formed as integral continuations of the central Fresnel lens. The catadioptric portion is free from the narrow limitations as to extent of spherical angle subtended that apply to the Fresnel lens and may be extended to include a much larger proportion of the light flux.

Figure 1 is a view of the inner face of the preferred form of lens.

Figure 2 is a vertical section through the lens of Figure 1 showing diagrammatically the position of the light source.

Figure 3 is a view of the outer face of the lens.

Figure 4 is a view of the inner face of a modified form of lens.

Figure 5 is a vertical section through the lens of Figure 4.

Figure 6 is a top plan view of the lens of Figure 4.

Figure 7 is a section through a further modification.

Figure 8 is a fragmentary view showing the modification in Fig. 2.

Referring to Figures 1 to 3, the central portion of the lens is denoted by the reference character 10, and is of the well known Fresnel type consisting of a series of concentric annular prisms that receive the light emitted from the source S within the angle alpha and by refraction erected into parallel rays as indicated by the lines 12. The angle alpha is preferably approximately the maximum angle within which the Fresnel type of lens is effective for beyond this a good deal of the light striking a lens of this type is reflected at the bounding surfaces of the lens and such as is transmitted is broken into component wave lengths and scattered about.

The portion of the lens marked 14 is catadioptric, that is, it operates by reflection as well as refraction to direct the light. Thus, tracing the ray 16 it will be noted that upon striking the adjacent face of one of the annular prisms it is refracted and directed toward the opposite surface of the prism where it is internally reflected, and directed forwardly substantially parallel to the axis of the lens. To secure the internal reflection, it is a prerequisite that the complement of the angle beta which the ray 16 makes with the totally reflecting surface shall not exceed the critical angle for the particular glass used, in this instance 42°. In order that the rays may be directed parallel to the axis the outer surface of each of the annular prisms constituting the catadioptric portion of the lens should theoretically be of paraboloidal contour but as the light source is not a theoretical point source, and no great exactness in direction of the light is essential, it is sufficient to make the surfaces plane.

It will be noted by reference to Figure 2 that the annular prisms 18 extend further along the axis in the direction of the light source than does the annular prism 20 and the annular prism 20 extends further in the same direction than the prisms 22. This design results in the production of the rearwardly curved surface 21 on the outer face of the lens. The purpose of this is to increase the efficiency of the lens. Referring to the lens ring 20, it will be noted that the light from the source S falling within the angle gamma is subject to refraction and internal reflection in the manner described, and is projected forwardly in the desired direction. The light falling within the angle mu strikes the circular prism 20 at such an angle that no internal reflection takes place at the outer surface of the prism, and this light is scattered about as a result of refraction, and is, in effect, wasted. The arrangement of the prisms in stepped series as described reduces the angle mu to a minimum, and makes the lens more efficient.

I have illustrated the lens shown in Figures 1 to 3 as provided with vertical flutes 20' on the outer surface to spread the light laterally. These flutes are relatively shallow so that the outer face of the lens remains substantially smooth in the sense that there are no deep grooves or sharp projections that prevent easy cleaning of it. It is to be understood that such flutes may be used or not as desired, my invention having to do primarily with the more efficient concentration of the light rays into a beam. Obviously, the addition of such flutes to a lens otherwise coming under the claims of this patent does not take it outside of the scope of my patent for the advantage of concentration is then obtained at least with respect to one diameter through the lens.

My lens differs radically from prior catadioptric lenses with which I am familiar in that it is so designed as to permit of its manufacture by pressing. To accomplish this it has been necessary to so design the lens that there are no grooves or depressions which prevent the ready separation of the lens from the mold and plunger. To permit easy separation, I have found it essential that the sides of the annular prisms shall not make less than a 2° angle with the axis of the lens, otherwise the glass upon shrinking is likely to grip the ridges on the mold or plunger, and interfere with the removal of the lens.

The form of lens shown in Figures 4 to 6 differs from that previously described in that the catadioptric annular prisms 26 are increased in number, and the stepping has been eliminated. Here also the flutes 22' extend the full height of the glass.

The lens shown in Figure 7 is designed to intercept a greater amount of light from the source, and this is done by making it of convex form, and increasing the number of annular catadioptric prisms 28. It will also be noted that the exterior of the lens is provided with concentric flats 30 in planes perpendicular to the axis of the lens. The flats are of advantage in design in that they permit an increase in the angle gamma and a decrease in the angle mu as described in connection with Figure 2. This follows from the fact that the perpendicular surfaces permit the reflected rays to pass from the total reflecting surfaces outwardly in directions parallel to the axis without further deflection. It will be noted that the two outermost prisms are provided with inclined surfaces at 32. These surfaces define prisms which direct into parallel with the lens axis the rays, such as that shown at 34, which would otherwise be deflected outwardly. The outward deflection of rays for which the prisms 32 correct is the result of the angle given to surfaces 35. While it would seem that this outward deflection could be avoided by arranging the surfaces 35 at a sharper angle with the lens axis, this is not possible because the angle then becomes so close to the critical angle of the glass that some of the light passes through it, and is scattered about, thus reducing the efficiency of the lens. Hence it is best to use a larger angle at the surfaces 35, and to correct for the outward deflection of rays by the use of prisms at 32.

In Figure 8 I have shown a slight modification of the lens illustrated in Figure 2. Here the annular catadioptric prisms 120 are provided with extensions 122. These extensions subtend the angle mu referred to in the discussion of Figure 2, and redirect the corresponding rays in directions parallel with the axis. The extensions 122 accomplish this by double reflection. For example, the ray 124, as shown on Figure 8, strikes the adjacent surface of one of the annular prisms 122, and is reflected at the opposite surface of the prism. It is then again reflected at the adjacent surface of the prism, and by subsequent refraction emerges from the lens in a parallel direction. By the use of these extensions it is obvious that the efficiency of the lens is greatly increased, and the loss represented by the angle mu is greatly reduced.

With the type of lens herein disclosed, the amount of light projected in the desired direction is so increased over the ordinary bulls-eye lens that the reflector heretofore customarily used can be dispensed with without loss in light efficiency with the result that the cost of the lamp is considerably reduced. There would be no saving were it not for the fact that the lens is so designed as to permit its being pressed out of glass.

I claim:

1. A one piece lens comprising a central condensing lens, and a surrounding annular catadioptric lens having annular prism portions, said lenses having a common focus, the sides of each of said prism portions diverging by an angle of at least 2° from a line passing through the apex of the corresponding portion of the lens and extending parallel to the axis of the lens.

2. A one piece lens comprising a plurality of coaxial annular catadioptric prism portions having a common focus, the sides of each of said prism portions diverging by an angle of at least 2° from a line passing through the apex of the corresponding portion of the lens and extending parallel to the axis of the lens.

3. A lens comprising a plurality of contiguous annular catadioptric prism portions, said prism portions having a common focus, one of said catadioptric prism portions near the axis extending further toward the light source in an axial direction than the surrounding contiguous prism portion, the first mentioned prism portion terminating at a point adjacent the path of the outermost of the rays internally reflected by the surrounding prism portion so as to intercept light that would otherwise pass through the lens between said prism portions, thereby increasing the efficiency of the lens.

4. A lens comprising a central dioptric lens portion and a plurality of contiguous annular catadioptric prism portions, said lens portions and prism portions having a common focus, one of said catadioptric prism portions near the axis extending further toward the light source in an axial direction than the surrounding contiguous prism portion, the first-mentioned prism portion terminating at a point adjacent the path of the outermost of the rays internally reflected by the surrounding prism portion so as to intercept light that would otherwise pass through the lens between said prism portions thereby increasing the efficientcy of the lens.

5. A lens comprising a plurality of contiguous annular, catadioptric prism portions having a common focus, the inner prism portion with respect to the lens axis being provided with an axially extending tip having an included angle less than the included angle of the prism portion, said tip extending to the path of the outermost of the rays internally reflected by the surrounding prism portion and redirecting by internal reflection onto the internally reflecting surface of said inner catadioptric prism portion rays that would otherwise pass through the lens between said prism portions, thereby increasing the efficiency of the lens.

6. In the lens as defined in claim 5, the sides of each of said prism portions and said lens tip diverging by an angle of at least 2° from a line passing through the apex of the corresponding portion of the lens and extending parallel to the axis of the lens.

7. A lens comprising a central condensing lens and a plurality of contiguous annular, catadioptric prism portions surrounding the condensing lens and having a common focus, the inner catadioptric prism portion with respect to the lens axis being provided with an axially extending tip having an included angle less than the included angle of the prism portion, said tip extending to the path of the outermost of the rays internally reflected by the surrounding catadioptric prism portion and redirecting by internal reflection on to the internally reflecting surface of said inner catadioptric prism portion, rays that would otherwise pass through the lens between said prism portions, thereby increasing the efficiency of the lens.

8. A lens comprising a plurality of contiguous annular catadioptric prism portions, said prism portions having a common focus, one of said catadioptric prism portions near the axis extending further toward the light source in an axial direction than the surrounding contiguous prism portion, the first mentioned prism portion terminating at a point adjacent the path of the outermost of the rays internally reflected by the surrounding prism portion so as to intercept light that would otherwise pass through the lens between said prism portions, thereby increasing the efficiency of the lens, the sides of each of said prism portions diverging by an angle of at least 2° from a line passing through the apex of the corresponding portion of the lens, and extending parallel to the axis of the lens.

9. A one piece lens comprising a central condensing lens and a coaxial annular catadioptric prism portion, said condensing lens and catadioptric prism portion having a common focus, the sides of the lens and of the prism portion diverging by an angle of at least two degrees from a line passing through the apex of the corresponding portion of the lens and extending parallel to the axis of the lens.

JOHN B. DICKSON.